(12) United States Patent
Emrich et al.

(10) Patent No.: US 7,801,494 B2
(45) Date of Patent: Sep. 21, 2010

(54) METHOD FOR POC SERVER TO HANDLE POC CALLER PREFERENCES

(75) Inventors: John E. Emrich, Bartlett, IL (US); Balakumar Jagadesan, Glendale Heights, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1090 days.

(21) Appl. No.: 11/139,719

(22) Filed: May 27, 2005

(65) Prior Publication Data

US 2006/0270362 A1 Nov. 30, 2006

(51) Int. Cl.
*H04B 1/44* (2006.01)
*H04B 7/00* (2006.01)

(52) U.S. Cl. ..................... 455/90.2; 455/518

(58) Field of Classification Search ............... 455/436, 455/437–442, 432.1, 406, 518, 90.2, 426.1; 370/315, 352, 437, 260, 390
See application file for complete search history.

(56) References Cited

U.S. PATENT DOCUMENTS

| | | | |
|---|---|---|---|
| 7,277,434 B2 * | 10/2007 | Astarabadi et al. | 370/389 |
| 2001/0021638 A1 * | 9/2001 | Spratt et al. | 455/11.1 |
| 2002/0169776 A1 | 11/2002 | Tuunanen et al. | |
| 2003/0017836 A1 | 1/2003 | Vishwanathan et al. | |
| 2003/0112947 A1 | 6/2003 | Cohen | |
| 2004/0264410 A1 * | 12/2004 | Sagi et al. | 370/331 |
| 2005/0070286 A1 * | 3/2005 | Awasthi et al. | 455/436 |
| 2006/0046758 A1 * | 3/2006 | Emami-Nouri et al. | 455/518 |
| 2006/0075132 A1 * | 4/2006 | Liu | 709/236 |
| 2006/0087982 A1 * | 4/2006 | Kuure et al. | 370/252 |
| 2006/0116127 A1 * | 6/2006 | Wilhoite et al. | 455/442 |
| 2006/0174009 A1 * | 8/2006 | Martiquet et al. | 709/227 |

OTHER PUBLICATIONS

3GPP; "Universal Mobile Telecommunications System (UMTS); 3GPP Enablers for Open Mobile Alliance (OMA) Push-to-Talk Over Cellular (POC) Services; Stage 2 (3GPP TR 23.979 Version 6.1.0 Release 6)"; ETSI TR 123 979 V6.1.0, Mar. 2005, pp. 1-38.

(Continued)

*Primary Examiner*—Melody Mehrpour
(74) *Attorney, Agent, or Firm*—Sylvia Chen

(57) ABSTRACT

A Push-to-X over Cellular (PoC) server (351) receives a server registration message (301) for a first called device from a second server. The PoC server (351) receives a PoC invitation message (310) with PoC preferences and a message (313) from an originating device (311). The PoC preferences determine what device to call first (e.g., a mobile device 315, 317) and how many hops the call can be forwarded (e.g., to a voicemail server) if the first-attempted device is not available, before discontinuing the connection. If a trigger, such as time elapsed, occurs for the first-attempted device (350) and the PoC preferences permit, the PoC server (351) sends an invitation message (360) to the second server (391). If the second server (391) is a recording server, the invitation message (360) includes a message (363) from the originating device that is compatible with the capabilities of the recording server (391).

20 Claims, 5 Drawing Sheets

OTHER PUBLICATIONS

3GPP; "Digital Cellular Telecommunications System (Phase 2+); Universal Mobile Telecommunications System (UMTS); IP Multimedia (IM) Session Handling; IM Call Model; Stage 2 (3GPP TS 23.218 Version 6.2.0 Release 6)"; ETSI TS 123 218 V6.2.0; Sep. 2004; pp. 1-58.

3GPP; Digital Cellular Telecommunications System (Phase 2+); Universal Mobile Telecommunications System (UMTS); Internet Protocol (IP) Multimedia Call Control Protocol Based on Session Initiation Protocol (SIP) and Session Description Protocol (SDP); Stage 3 (3GPP TS 124.229 Version 5.12.0 Release 5); ETSI TS 124.229 V5.12.0; Mar. 2005; pp. 1-262.

Jonathan Lennox, Xiaotao Wu & Henning Schulzrinne; "Call Processing Language (CPL): A Language for User Control of Internet Telephony Services", Internet Engineering Task Force (IETF) Network Working Group, Request for Comments: 3880; Oct. 2004; pp. 1-74.

U.S. Appl. No. 60/648,674, filed Jan. 31, 2005, Wild et al.

Johnston, et al.; "SIP Service Examples"; Internet Engineering Task Force; Nov. 2001; 81 pages.

Ericsson; "Direct PoC BoX"; OMA (Open Mobile Alliance); Jan. 23, 2005; 4 pages.

Anett Schulke; "PoC2-UC-Human-Machine-Scenario"; OMA (Open Mobile Alliance); Jan. 21, 2004; 6 pages.

Johanna Wild; "PoC 2 Use Cases—Interactions with Machines"; OMA (Open Mobile Alliance); Oct. 19, 2004; 5 pages.

Paul Resnick, Robert A. Virzi; "Skip and Scan: Cleaning Up Telephone Interfaces"; ACM; May 7, 1992; pp. 419-426.

Dr. Harry C. Benham, Dr. Bruce C. Raymond; "Information Technology Adoption: Evidence from a Voice Mail Introduction"; Computer Personnel; Jan. 1996; pp. 3-25.

Great Works Internet; "Voicemail Systems"; http://www.gwi.net/support/dialup/voicemail.html; 2004.

Riverside Community College District; "Voicemail Users Guide".

* cited by examiner

US 7,801,494 B2

METHOD FOR POC SERVER TO HANDLE POC CALLER PREFERENCES

FIELD OF THE DISCLOSURE

This disclosure relates generally to cellular communication systems, in particular the provision of push-to-X (PTX) services in a cellular communication system.

BACKGROUND OF THE DISCLOSURE

Push-to-talk (PTT) refers to a half-duplex mode of communication during which a single user has mutually exclusive use of a wireless communication channel for the transmission of voice information to another user or group of users. From an operational viewpoint, originating party User A presses a PTT switch on a mobile device, possibly awaits a "ready" tone, speaks into a microphone of the mobile device, and then releases the PTT switch. At this point, a former called party User B can press a PTT switch, possibly await a "ready" tone, speak into the microphone, and release the PTT switch. This procedure is repeated with different parties becoming the originating user and transmitting to one or more called parties in the group call until the conversation has completed.

With PTT and other PTT-related (PTX) services being available over a cellular communication network, PTX over Cellular (PoC) services are starting to address the merging of PTX and other telephony services—such as the merging of PTT with voicemail services. If a called party User B forwards a PoC call to a voicemail server, the outgoing message of the voicemail may grab the "floor" and thus have mutually exclusive use of the communication channel for the duration of the outgoing message. Meanwhile, originating party User A and other group call participants such as User C may have to endure the outgoing message of User B's voicemail when User A would rather have avoided User B's voicemail system entirely.

Thus, there is an opportunity to improve a user's experience in situations where a PoC call is forwarded to a voicemail server. The various aspects, features and advantages of the disclosure will become more fully apparent to those having ordinary skill in the art upon careful consideration of the following Drawings and accompanying Detailed Description.

DETAILED DESCRIPTION OF THE PREFERRED EMBODIMENTS

A Push-to-X over Cellular (PoC) server receives a server registration for a first device from a second server. The PoC server receives a PoC invitation message with PoC preferences and a message from an originating device. The PoC preferences determine what device to call first (e.g., a mobile device) and how many hops the call can be forwarded (e.g., to a voicemail server) if the first-attempted device is not available, before discontinuing the connection. If a trigger, such as time elapsed, occurs for the first-attempted device and the PoC preferences permit, the PoC server sends an invitation message to the second server. If the second server is a recording server, the invitation message includes a message from the originating device that is compatible with the capabilities of the recording server.

If no hops are allowed, the connection to a particular called party will be discontinued if the first-attempted device is not available. This is useful when an originating user only wants to reach a person immediately. If one or more hops are allowed, the connection to a particular called party can be forward to additional servers, including recording servers. If the connection is forwarded to a recording server, a recorded message from the originating user can be sent to the recording server without interrupting the group call. A recorded message from the originating user can be selected or modified depending on the capabilities of the recording server.

Figure 1:
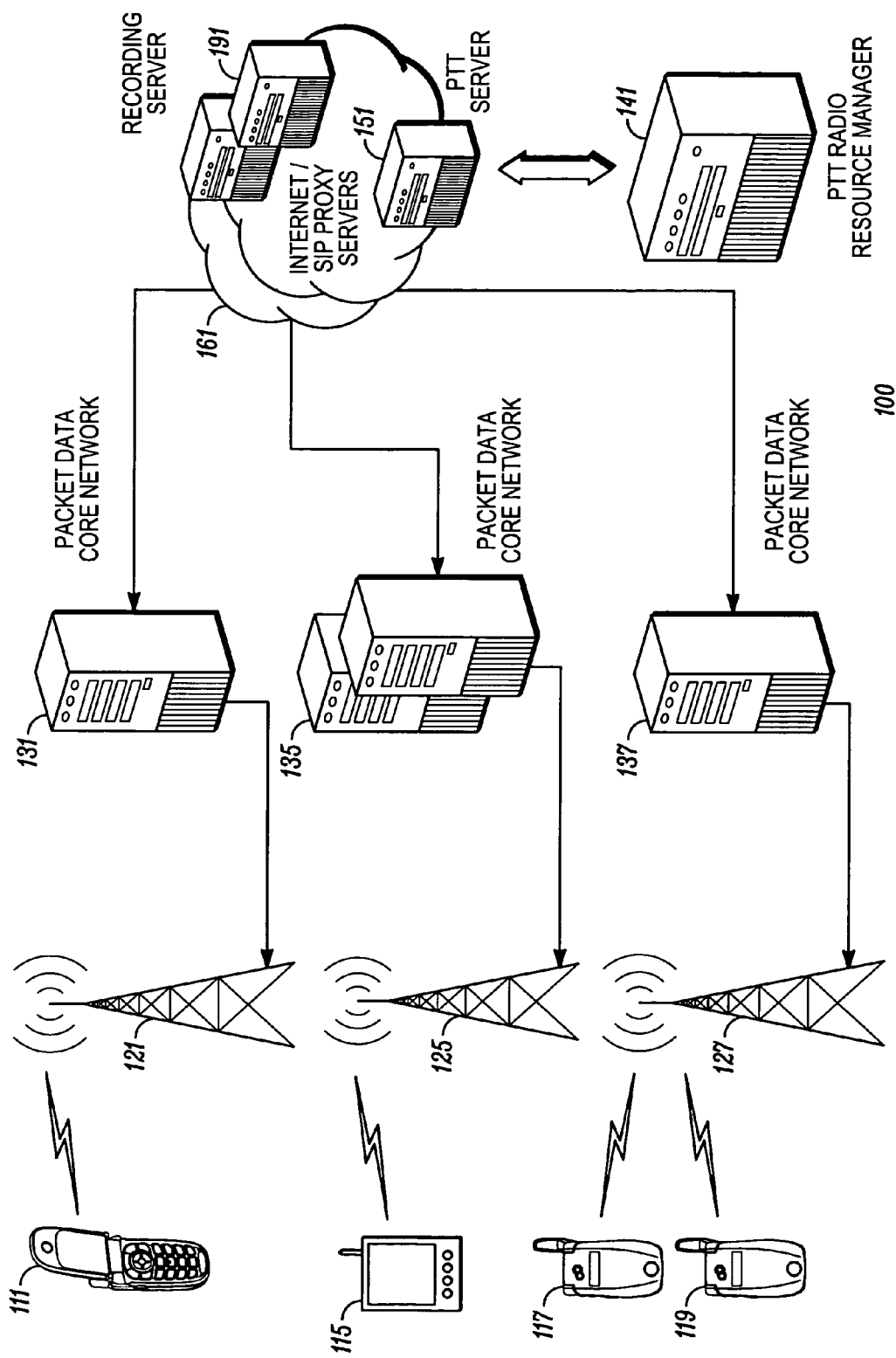
FIG. 1 shows a push-to-talk over cellular (PoC) system architecture according to an embodiment.

FIG. 1 shows a push-to-X over cellular (PoC) system architecture 100 according to an embodiment. PoC systems, both terrestrial and satellite, generally utilize a network component (e.g., a PTT server 151) to (a) set up and control required radio resources and (b) establish and manage the switching of voice data. Note that this system architecture can be expanded to include not only push-to-talk services, but also push-to-message, push-to-video, and other extensions of the push-to-talk concept into other forms of communication and services.

In this PoC system architecture 100, an originating mobile device 111 wirelessly communicates with a radio access network 121. This radio access network 121 connects to a packet data core network 131 which in turn connects to a PTT radio resource manager 141 and a PTT server 151 (sometimes called a PTT data switch) through the Internet 161, SIP proxy servers, or other data network elements. The PTT radio resource controller 141 (sometimes called a PTT radio resource manager) communicates with the PTT server 151. Other elements, such as recording servers 191 are also coupled to the network. Other packet data core networks 135, 137 are connected to the Internet 161, while other radio access networks 125, 127 are connected to the packet data core networks. Called mobile devices 115, 117, 119 are wirelessly connected to one or more of the available radio access networks 121, 125, 127. Any two or more of these mobile devices 111, 115, 117, 119 can establish a group call by one mobile device (such as originating mobile device 111) requesting a PoC call with one or more other mobile devices (such as called mobile device 115) in accordance with an agreed-upon protocol such as Session Initiation Protocol (SIP).

In this embodiment, the PoC system architecture 100 is implemented as part of a Global System for Mobile communications (GSM) system, with the radio access networks being GSM General Packet Radio Service (GPRS) radio access networks and the packet data core networks 131, 135, 137 being Gateway GPRS Support Nodes (GGSNs) and Serving GPRS Support Nodes (SGSNs). Alternately, the PoC system architecture 100 can be implemented as part of a CDMA system, with the radio access networks 121, 125, 127 being CDMA 1× radio access networks and the packet data core networks 131, 135, 137 being Packet Data Switching Networks (PDSNs). The PoC system architecture can have additional or alternate radio access networks and core networks, including combinations and hybrids that develop as technology progresses.

In this example, an originating mobile device 111 wirelessly communicates with a radio access network 121. For the purposes of providing detail for this preferred embodiment, the originating mobile device 111 is a GSM device and the radio access network 121 is a GSM GPRS radio access network; however, alternate radio access networks are applicable as mentioned previously. The radio access network 125 connects to a packet data core network 135, implemented as an SGSN and GGSN, which in turn uses an Internet Protocol (IP) and Session Initiation Protocol (SIP) to connect to the PTT radio resource controller 141 and PTT server 151 through the Internet 161.

A called mobile device 115 wirelessly communicates with a different radio access network 125, which is also a GSM GPRS radio access network in this example. The radio access network 125 connects to a packet data core network 135, implemented as another SGSN and GGSN, which in turn uses an Internet Protocol (IP) and Session Initiation Protocol (SIP) to connect to the PTT radio resource controller 141 and PTT server 151 through the Internet 161. Further called mobile devices 117, 119 wirelessly communicate with yet another radio access network 127. The radio access network 127 connects to a packet data core network 137, which in turn connects to the PTT radio resource controller 141 and PTT server 151 through the Internet 161.

Although the mobile devices 111, 115, 117, 119 are shown as wireless telephones and a personal digital assistant, one or more mobile devices could be implemented as other types of wireless device such as pocket personal computers or laptop computers.

If the mobile device 111 is operated by an originating party (User A), a signal goes from the mobile device 111 through the radio access network 121 and packet data core network 131 to the PTT radio resource controller 141, which sets up the path for communication data. Once the PoC circuit is set up, User A's communication data is sent from the mobile device 111 to the radio access network 121, to the packet data core network 131, and to the PTT server 151. The PTT server 151 forwards User A's communication data to the packet data core networks 135, 137 of the called parties, which in turn go to the radio access networks 125, 127 of the called parties and then the mobile devices 115, 117, 119 of the called parties.

Called party User B may have the mobile device 115 forwarded to a recording server 191 (such as a voicemail system) because User B's mobile device 115 is not being answered, is powered down, or is roaming in a network that does not support PoC services. In such an instance, User B may unintentionally participate in the call through User B's outgoing message on the voicemail server. The outgoing message may grab the "floor" and maintain the floor throughout the duration of the outgoing message. At this point, all the other participants on the call are forced to listen to User B's outgoing voicemail message. Once User B's voicemail server releases the floor, the originating user (User A) may hang up or interact with the voicemail server by leaving a message and/or working with the voicemail menu system. Note that the recording server 191 can also be implemented as an electronic mail server or another type of server used for disseminating outgoing messages or storing incoming messages. In the case of an electronic mail server, note that an electronic mail server might be implemented as a component in a text messaging or paging system.

A further complication occurs when more than one user, such as User B with mobile device 115 and User D with mobile device 119, has calls forwarded to their voicemail server(s). In this situation, two outgoing messages may attempt to grab the floor at approximately the same time. The result might be that one outgoing message grabs the floor and the other outgoing message is at least partially blocked because it does not have the floor. Alternately, the voice mail servers may need to be addressed one after another, which would take up additional time during the beginning of the group call. It is also possible that a voicemail server that does not have the floor may terminate the call due to inactivity.

By equipping at least an originating mobile device with PoC caller preferences, the originating mobile device can avoid situations where outgoing messages of a recording server compete with each other or actual users for the floor. PoC caller preferences enable an originating user to specify whether PoC calls should be forwarded to a recording server (or another server) and allow the originating user to leave a message on a recording server without interrupting the PoC conversation.

Figure 2:
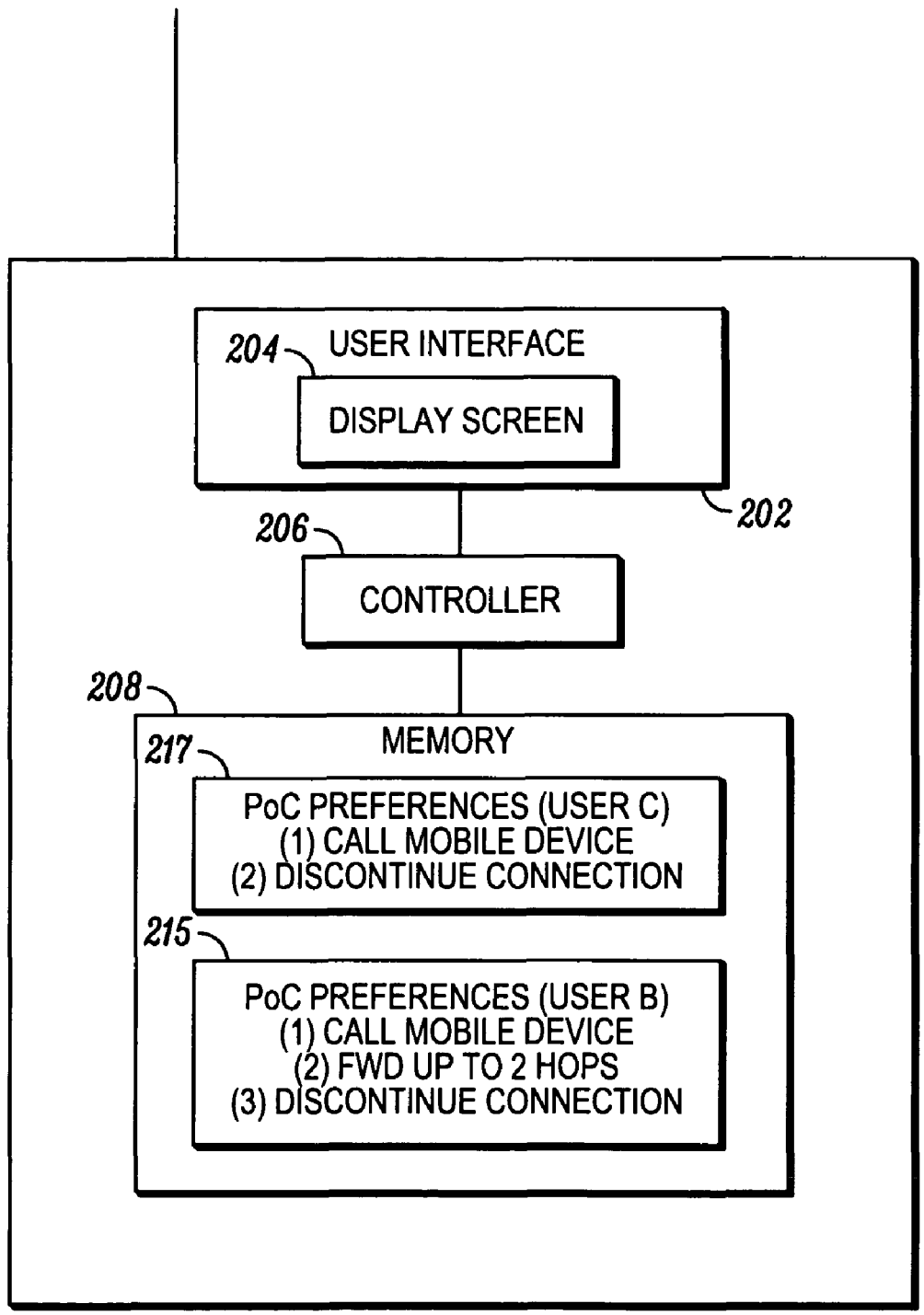
FIG. 2 shows a block diagram of a mobile device according to an embodiment.

FIG. 2 shows a block diagram of a mobile device 200 according to an embodiment. The mobile device 200 can be any of the mobile device 111, 115, 117, 119 shown in FIG. 1. The mobile device 200 includes a user interface 202 coupled to a processor 206, such as one or more microprocessors, microcontrollers, digital signal processors (DSPs), or equivalents or combinations thereof. The mobile device 200 further includes at least one memory device 208 associated with a processor 206, such as random access memory (RAM), dynamic random access memory (DRAM), and/or read only memory (ROM) or equivalents thereof, that maintain data and programs that may be executed by the processor 206 and that allow the mobile device 200 to perform all the functions necessary to operate in a compatible communication system such as the one shown in FIG. 1.

The user interface 202 provides a user of the mobile device 200 with the capability of interacting with the mobile device 200, including entering instructions into the mobile device 200. In one embodiment, the user interface 202 includes a display screen 204 and a keypad with multiple keys, including a PoC key. In alternate embodiments, the PoC key is implemented as a "soft key" or a region on a touchscreen rather than a discrete key.

The memory device 208 maintains a Mobile ID and a PoC Address that are uniquely associated with the mobile device 200. A PoC Address can be implemented as an e-mail address or a canonical telephone number. For example, a PoC Address may be a Session Initiation Protocol (SIP) Universal Resource Identifier or Locator (URI or URL) such as "someone@example.com." As another example, a PoC Address may be a Telephone (TEL) URI or URL, such as international number TEL: +1-888-555-1212, or a local number that uses a local dialing plan and prefix.

Additionally, the memory device 208 maintains a phone book listing of identifiers associated with one or more other devices. An identifier can be a PoC Address uniquely associated with a mobile device, a PoC Address of a voicemail or email server of a home network serving the mobile device 200, such as the recording server 191 shown in FIG. 1, or a talkgroup ID uniquely associated with multiple unique PoC Addresses. The identifiers may be pre-programmed into the memory device 208 or may be added to the memory device 208 by a user of the mobile device 200.

The memory device 208 further allows for PoC preferences regarding each entry in its phone book listing. The PoC preferences include the originating mobile device's prioritized list of preferred forwarding actions for a PoC call. Examples of a prioritized list are shown in memory element 215 for User B and memory element 217 for User C. When an originating mobile device (such as User A's mobile device 115 shown in FIG. 1) with a prioritized list such as that shown in memory elements 215, 217 seeks to establish a PoC call with User B, it will first call User B's mobile device (such as mobile device 115 shown in FIG. 1). If the PoC call is unable to connect because User B's mobile device 115 is not being answered, out of range, turned off, set to "do not disturb," or the like, memory element 215 shows that it is acceptable for the PoC call to be forwarded to a recording server such as recording server 191 shown in FIG. 1 or a different PoC Address. A further variable indicates how many forwarding hops are acceptable to the originating user, User A. For example, memory element 215 indicates that two hops are acceptable, which could be one hop to an alternate telephone number and a second hop to a recording server. If no alternate PoC Address is available or the hop count is exceeded, the memory element 215 indicates that the PoC call should discontinue the connection.

Another memory element 217 is established for User C's mobile device 117 shown in FIG. 1. In this situation, when User A's mobile device seeks to establish a PoC call with User C, it will first try to contact User C's mobile device (such as mobile device 117 shown in FIG. 1). If the PoC call is unable to connect because User C's mobile device 117 is not being answered, out of range, turned off, set to "do not disturb," or the like, memory element 217 indicates that the PoC call should end. Thus, memory element 217 establishes that, even though User C may have a recording server available, originating User A's preference is to not forward the PoC call to the recording server or any other PoC Address. In this situation, either originating User A will reach called party User C at User C's mobile phone or User A will not reach User C at all.

Note that this prioritized list can be set and modified by the originating caller on a per-call basis or less frequently. For example, if an originating user only wants to reach called users at their primary mobile device for a particular PoC call, then, prior to originating that PoC call, the originating user can set the prioritized lists to "(1) call mobile device and (2) discontinue connection" for each of the mobile devices to be called. If, however, the originating user wants to leave a message for one called party and try to reach all other called parties directly, the originating user can modify the prioritized list for that one party to be "(1) call mobile device, (2) allow forwarding a specified number of hops, and (3) discontinue connection" while leaving the other prioritized lists as "(1) call mobile device and (2) discontinue connection." Allowing forwarding 0 hops is another way to implement not allowing forwarding. Although it is theoretically possible to allow forwarding an unlimited number of hops, each hop generally causes delay and increases the risk of a loop where a hop returns the call to a server that has already been hopped-through.

As telephony services evolve and merge with other services such as presence, instant messaging, location-based services, electronic mail, and the like, the list of options for PoC preference lists will grow. PoC preference lists can keep track of the originating user's preferences and allow the caller to maintain some control over where the call is being forwarded and prevent unwanted effects, such as a voicemail outgoing message grabbing the floor.

Figure 3:
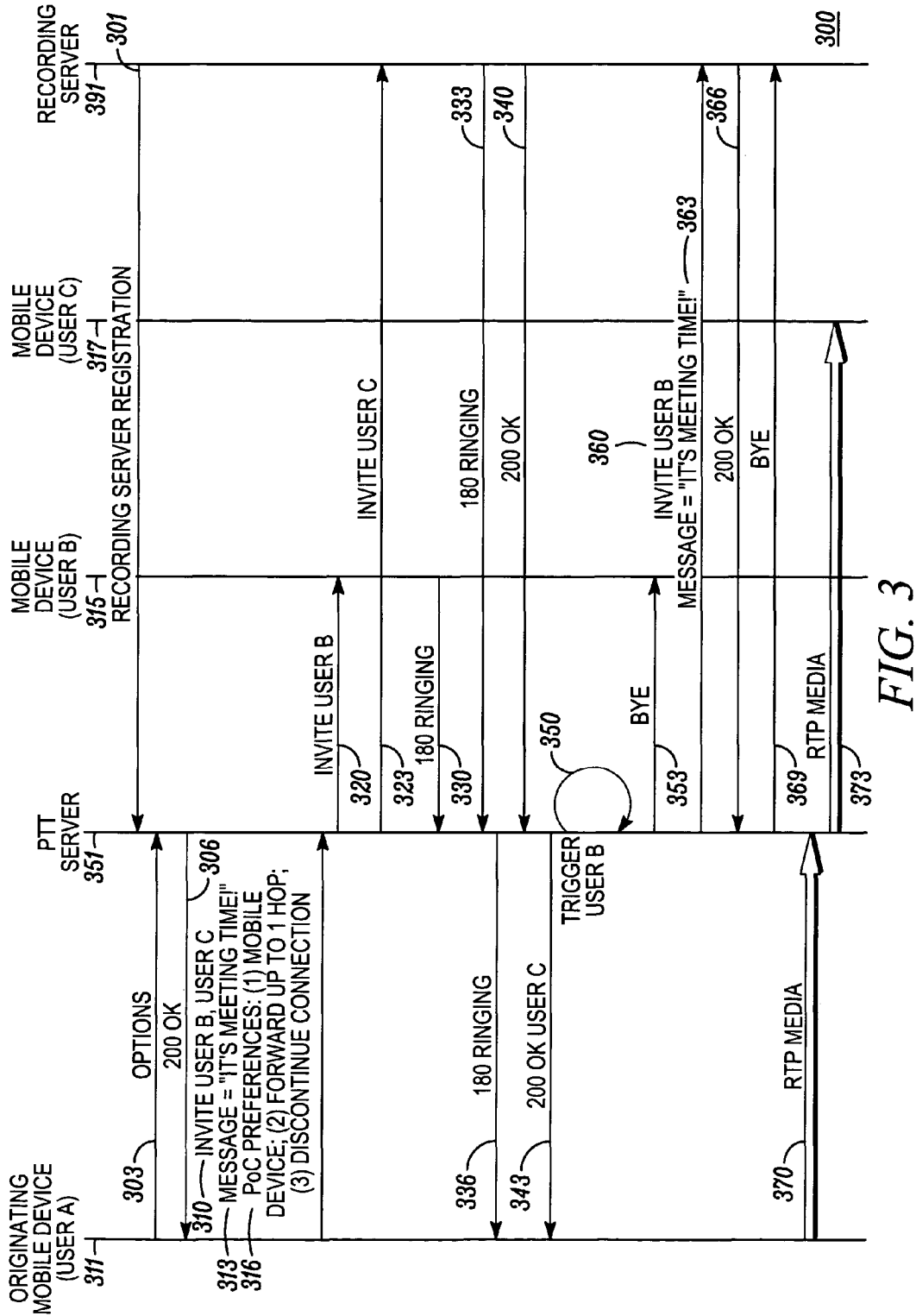
FIG. 3 shows a sample signal flow diagram for a push-to-talk system according to an embodiment.

FIG. 3 shows a sample signal flow diagram 300 for a push-to-talk system according to an embodiment. Vertical line 311 represents signaling to and from an originating mobile device A, such as mobile device 111 shown in FIG. 1. Vertical line 351 represents signaling to and from a PTT server, such as PTT server 151 shown in FIG. 1. Vertical line 315 represents signaling to and from a called mobile device B, such as mobile device 115 shown in FIG. 1. Vertical line 317 represents signaling to and from a called mobile device C, such as mobile device 117 shown in FIG. 1. Vertical line 391 represents signaling to and from a recording server, such as recording server 191 shown in FIG. 1. Note that there may be other servers involved in this communication session. For example, PTT server 351 may serve User A while another PTT server (not shown) serves User B and yet another PTT server (not shown) serves User C. Additionally, there may be intermediate servers that route messages but are not directly associated with any of the call participants. For the purposes of this explanation, no additional PTT servers are shown; however, additional servers affect the situation in that they increase the hop count and may introduce delay into the system.

Initially, the recording server 391 sends a recording server registration message 301 indicating the PoC Address of the recording server and its association with a mobile device. In this example, the recording server is a voicemail server for mobile device B. The recording server registration message 301 indicates the preference of mobile device B relative to the recording server. In this example, the message 301 indicates that mobile device B should first be contacted and then, should contacting mobile device B be unsuccessful, the recording server 391 should be contacted.

When User A desires to make a group call, the originating mobile device A 311 sends a SIP OPTIONS message 303 to query the PTT server 351 regarding any recording server registrations for the group call's participant list. The PTT server 351 returns a 200 OK message 306 with information regarding any recording servers registered to the participants, including the capabilities of the recording servers. Based on whether any participants have registered recording servers, and the capabilities of the recording servers, the originating mobile device 311 constructs a message that can be sent (with or without modifications) to one or more registered recording servers. For example, if a participant's recording server accepts multimedia messages, a photo of a watch and an audio recording of "It's meeting time!" plus the text "IT'S MEETING TIME" can be forwarded. If the recording server only accepts text messages then a text message 'IT' S MEETING TIME" can be constructed by stripping out non-text layers of the message 313 described earlier or by receiving and selecting a text-only message 313 from the originating mobile device. If a participant's recording server accepts audio messages, then an audio recording of "It's meeting time!" can be made by stripping out non-audio layers of the multimedia message 313 described earlier or by receiving and selecting an audio-only message 313 from the originating mobile device.

By querying the existence and capability of participants' recording servers, the originating mobile device 311 can tailor messages to the capabilities of the available recording devices, which improves the user experience and reduces wasted bandwidth when, for example, a multimedia message is constructed at the originating device but no participant's recording server can accept a multimedia message. Additionally, the information in 200 OK message 306 can be used by User A to create personalized messages for called users rather than grouping the message by recording server type (e.g., text, audio, multimedia, etc.).

To initiate a PoC communication session, the originating mobile device A 311 sends one or more messages to the PTT server 351 containing a SIP INVITE message 310 identifying target mobile devices. The identifier of the target mobile devices can be a PoC Address such as a telephone number or email address. Depending on implementation, a single SIP INVITE message can include a single PoC Address or multiple PoC Addresses. Optionally, the initial set of INVITE-related messages includes an audio, visual, or multimedia message 313 such as "It's Meeting Time" in the recorded voice of the user A, a text message "It's Meeting Time," a graphic icon of an alarm clock, or more than one of the messages above. Also, the initial set of INVITE-related messages can include originating mobile device PoC preferences 316. For example, user A may have determined that the PTT server 351 should, for all called mobile devices, first attempt a connection with the target mobile device, then any recording server associated with the target mobile device, and hang up if neither the target mobile device nor its recording server can be reached.

In response to the SIP INVITE message 310 from the originating mobile device 311, the PTT server 351 sends an INVITE message 320 to User B and an INVITE message 323 to User C. These secondary INVITE messages 320, 330 occur in parallel. Mobile device B 315 responds to the SIP INVITE message 320 with a SIP 180 RINGING message 330. Mobile device C 317 responds to the SIP INVITE message 323 with a SIP 180 RINGING message 333. The PTT server 351 processes these SIP 180 RINGING messages normally and sends a SIP 180 RINGING message 336 to the originating mobile device A 311.

Shortly after, in this example, mobile device C 317 is answered either automatically or manually, and a SIP 200 OK message 340 goes from the mobile device C 317 to the PTT server 351, which sends a SIP 200 OK message 343 to the mobile device A 311. At this point, the originating mobile device 311 and PTT server 351 set up a Real Time Protocol (RTP) media session 370 from the originating mobile device 311 to the PTT server 351 and another RTP media session 373 from the PTT server 351 to the mobile device 315 that has accepted the call. Now, User A can communicate from mobile device 311 to mobile device 315. If additional mobile devices (not shown) are participating in the group call, further secondary RTP media sessions, similar to RTP media session 373, can be established with the PTT server 351, and the information in RTP media session 370 will be sent to the additional mobile devices as they answer the group call.

Meanwhile, mobile device B 315 has not been answered and the PTT server 351 awaits a trigger indicating that the PTT should no longer continue to wait. The trigger can be implemented as a ring count (e.g., wait no longer than six rings), a timer (e.g., wait no longer than 30 seconds), or another triggering mechanism. One the trigger has occurred 350, the PTT server 351 sends a SIP BYE message 353 to the mobile device B 315 to cancel the previous SIP INVITE message 320 to User B. Next, the PTT server 351 sends a SIP INVITE message 360 to User B at the second-choice PoC Address in accordance with the PoC preference list 316 expressed in the initial set of messages from the originating mobile device A 311. In this situation, the second-choice is a recording server 391, whose PoC Address is determined from the recording server registration message 301 sent earlier to the PTT server 351. Based up the PTT server's knowledge of the capabilities of the recording server, the PTT server 351 can also forward a message 363 to the recording server 391 reflecting the message 313 from the originating mobile device A 311.

Note that the message 313 can have more than one layer or part (e.g., voice, text, photo, video, etc.), and the appropriate layers of the message 313 can be sent to the recording server 391 depending on the recording server's capability. For example, only the voice layer of the message 313 will be forwarded to a voicemail server and only the text layer of the message 313 will be forwarded to a text server, but multiple layers of the message 313 will be forwarded to a multimedia messaging server. Additional layers of the message 313 can include flags for "urgent" or data such as location information of the calling party.

The recording server 391 responds with a SIP 200 OK message 366 for User B, and the PTT Server 351 closes the session with a SIP BYE message 369 to the recording server 391. Because only User C is available for the group call at mobile device C 317, when mobile device A 311 has the floor, it sends an RTP media message 370 to the PTT server 351, which forwards it to mobile device C 317.

Thus, the originating User A and any available called parties (User C) can have a group call without being forced to listen to an outgoing message from non-available called parties (User B). If the originating User A would like to leave a message, it can be pre-recorded and sent to a called party's recording server without interrupting the real-time group call. If the originating User A would not like to leave a message with a called party (User B), then the PTT Server 351 can disconnect the call if the called party is not available directly. Other variations of called party preferences are possible, as shown in FIGS. 4-5.

Figure 4:
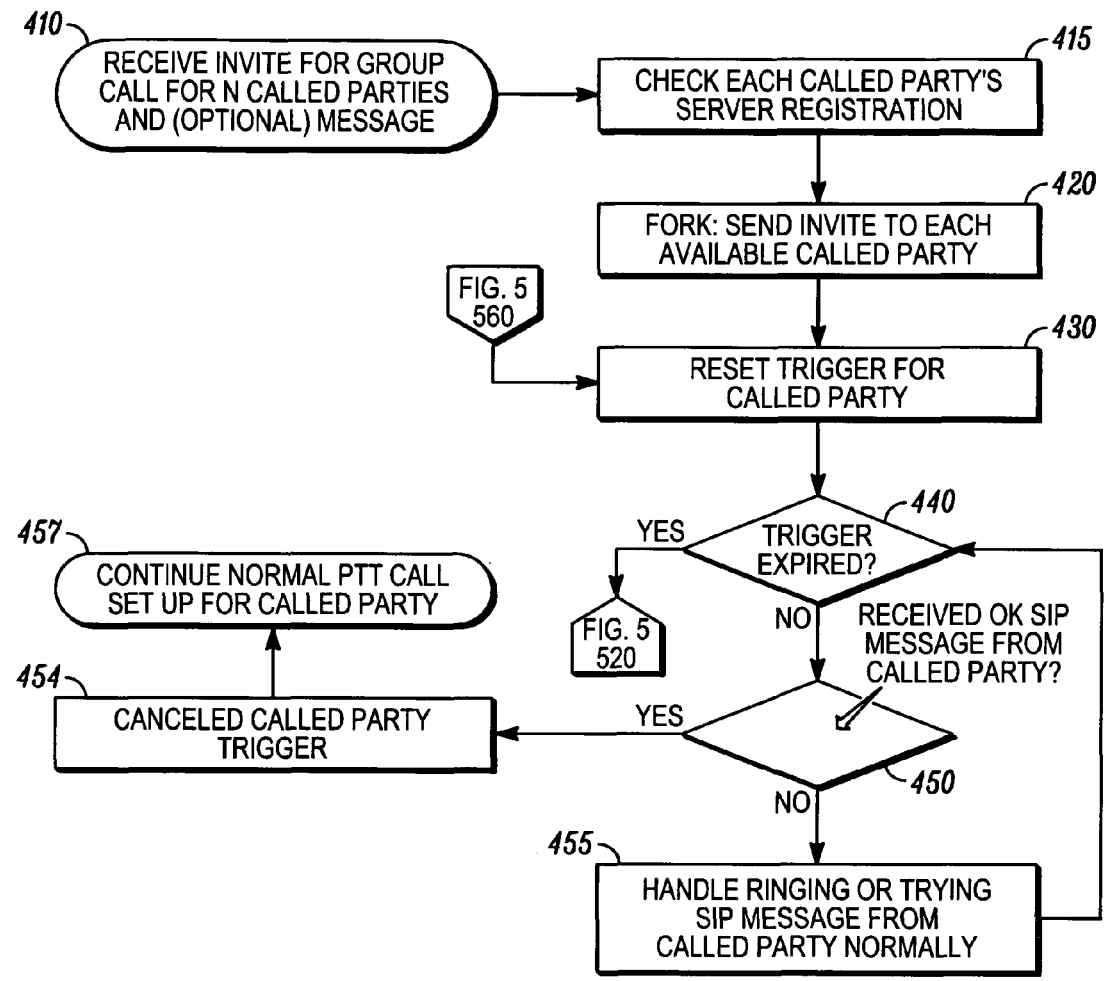
FIG. 4 shows a flow chart to be implemented in a PTT server for handling a calling device's priority list according to a second embodiment.
Figure 5:
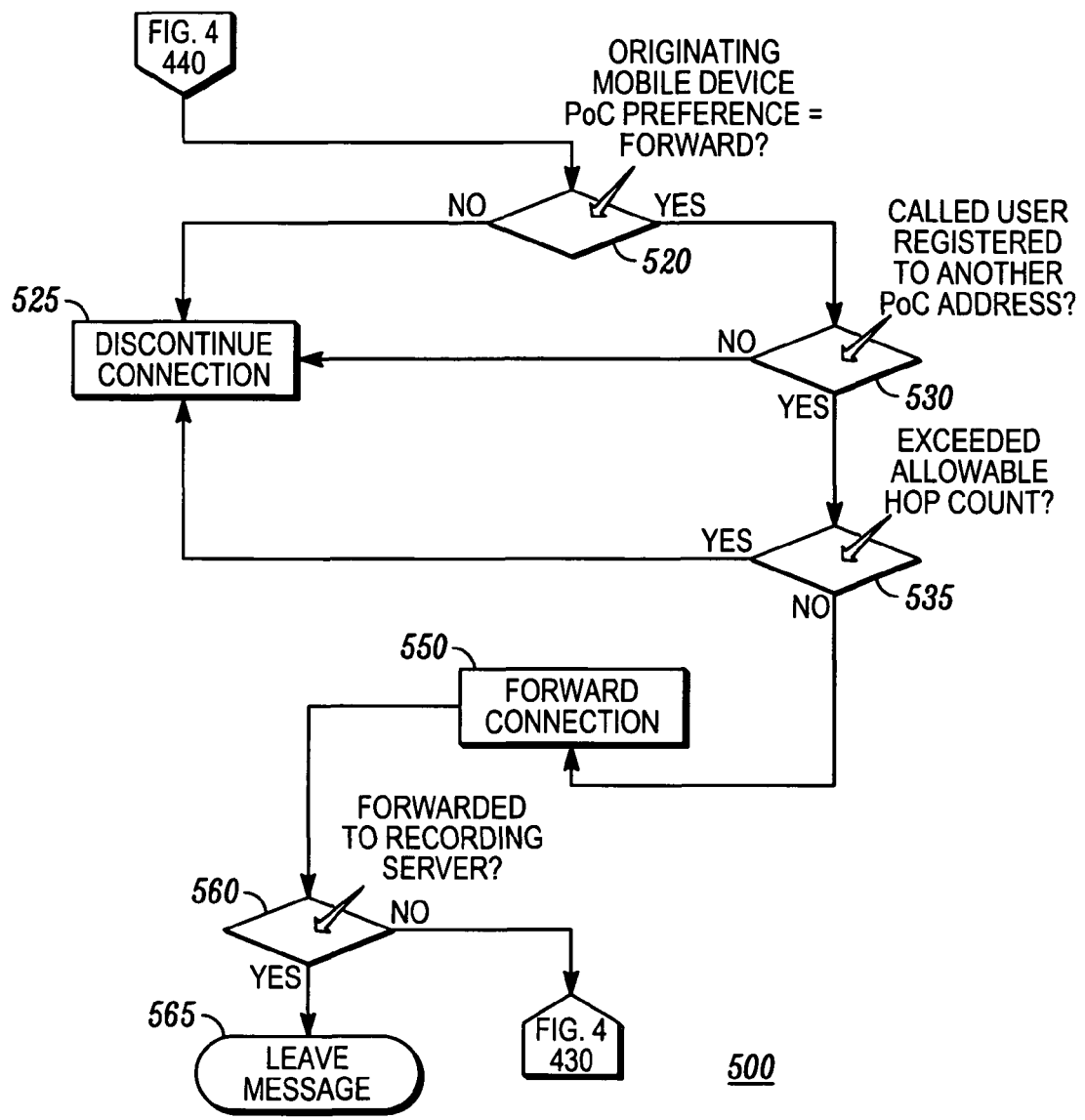
FIG. 5 shows a flow chart to be implemented in a PTT server for handling a calling device's priority list according to a first embodiment.

FIGS. 4-5 show a flow chart 400, 500 to be implemented in a PTT server for handling an originating party's PoC preference list according to an embodiment. A PTT server such as PTT server 151 shown in FIG. 1 can implement the flow chart 400. Memory element 215 of FIG. 2 can store the PoC preference list of the originating user.

Initially, step 410 receives an INVITE message for a group call for N called parties and, optionally, messages for the called parties, where N is a natural number. Step 415 checks each called party's server registration. Step 420 forks an INVITE message to each of the N called parties so that each of the N called parties is being sent an individual INVITE message. Forking can be implemented in a PTT server using separate state machines for each called party operating in parallel. Step 430 resets individual triggers for each called party. As stated earlier, triggers can be timers, ring counts or other mechanisms. Step 440 determines if a particular called party's trigger has tripped. If the trigger has expired, then the flow goes to step 520 in FIG. 5.

If the trigger has not tripped and step 450 determines that an OK message has been received from the called party related to that trigger, then step 454 cancels that called party's trigger and step 457 continues with a normal PoC call set-up for that called party.

If the trigger has not tripped and step 450 determines that no OK message has yet been received, then step 455 handles any message received (such as a RINGING or TRYING message) normally and returns to step 440.

Turning to FIG. 5, step 520 checks whether the originating user's PoC preference list shows a preference for the call to be forwarded. If there is no preference for the call to be forwarded, step 525 discontinues the connection for that called party. If there is a preference for the call to be forwarded, step 530 determines if the called party has implemented call forwarding to another PoC Address. If not, step 525 discontinues the connection. If the called party has a forwarding PoC Address, step 535 determines if forwarding the call would exceed the allowable hop count set by the originating user. If the hop count is not exceeded, then the connection is forwarded in step 550.

If step 460 determines that the connection is forwarded to a recording server, the originating user can leave a pre-recorded message without interrupting the other parties on the group call in step 465. Otherwise, the flow returns to step 430 in FIG. 4 to reset the trigger for that particular called party.

Returning to step 535, if the hop count is exceeded, than step 525 discontinues the connection. Note that the originating user may set a maximum hop count for a number of reasons. One is to limit delay in the PoC communications. As the hop count increases, the time delay for a PoC communication generally increases. Two is to limit the potential for a circular call-forwarding loop. One called party's phone may be forwarded to a secretary and that secretary's phone may be forwarded to a receptionist. If the receptionist's phone is forwarded back to the secretary, the originating user may become stuck in a call-forwarding loop. Three is to limit the potential for being forwarded to someone who is only peripherally related to the subject of the PoC call. The first hop may be from the called party's primary telephone (mobile device) to the called party's secondary telephone (office telephone), the second hop may be to the called party's secretary who is aware of the called party's availability, but a third hop may be to a company receptionist who is not aware of the called party's availability.

Thus, a PTT server implementing this flow chart can adhere to an originating party's PoC preferences for reaching a called party for a PoC call. By enabling PoC preferences, an originating user can leave messages with called parties without interrupting the real-time PoC call, can avoid recording servers as desired, and can limit the number of server hops in a PoC call.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

As understood by those in the art, processor 206 includes a processor that executes computer program code to implement the methods described herein. Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

We claim:

1. A method for a Push-to-X over Cellular (PoC) server comprising:
   receiving a server registration for a first called device from a second server;
   receiving a PoC invitation message with PoC preferences from an originating device to initiate a PoC communication session, wherein the PoC preferences indicate preferences of a user associated with the originating device (311); and
   sending an invitation message to the second server, if a trigger occurs for the first called device and the PoC preferences permit, wherein the trigger occurs when the first called device is unable to connect to the PoC communication session.

2. A method according to claim 1 further comprising, before sending an invitation message to the second server:
   receiving PoC addresses for one or more called parties from the originating device; and
   sending invitation messages to the one or more called parties.

3. A method according to claim 1 further comprising:
   sending a "BYE" message to the first called device, if the trigger occurs for the first called device.

4. A method according to claim 1 further comprising:
   receiving at least one recorded message from the originating device.

5. A method according to claim 4 wherein the at least one recorded message is at least one of: a text message, an audio message, a picture message, and a video message.

6. A method according to claim 4 further comprising:
   forwarding the at least one recorded message to the second server, if the trigger occurs for the first called device and the PoC preferences permit.

7. A method according to claim 6 further comprising:
   sending a "BYE" message to the second server.

8. A method according to claim 6 further comprising, before forwarding the at least one recorded message to the second server:
   determining messaging capabilities of the second server; and
   modifying the at least one recorded message based on the messaging capabilities of the second server.

9. A method according to claim 4 further comprising:
   determining messaging capabilities of the second server;
   selecting one message of the at least one recorded message based on the messaging capabilities of the second server; and
   forwarding the one message to the second server, if the trigger occurs for the first called device and the PoC preferences permit.

10. A method according to claim 4 further comprising:
determining messaging capabilities of the second server;
selecting one message of the at least one recorded message based on the messaging capabilities of the second server and a message preference of the originating device; and
forwarding the one message to the second server, if the trigger occurs for the first called device and the PoC preferences permit.

11. A method according to claim 4 further comprising:
selecting one message of the at least one recorded message that is compatible with messaging capabilities of the second server; and
forwarding the one message to the second server, if the trigger occurs for the first called device and the PoC preferences permit.

12. A method according to claim 11 further comprising:
sending a "BYE" message to the second server.

13. A method according to claim 1 further comprising:
sending a Real Time Protocol media message from the originating device.

14. A method according to claim 13 further comprising:
sending the Real Time Protocol media message to a second called device.

15. A method according to claim 1 wherein the server registration includes a PoC address for the second server.

16. A method according to claim 1 wherein the second server is a voicemail server.

17. A method according to claim 1 wherein the second server is an electronic mail server.

18. A method according to claim 1 wherein the second server is a multimedia messaging server.

19. A method according to claim 1 wherein the trigger is an elapsed timer.

20. A method according to claim 1 wherein the PoC preferences include a hop count limit.

* * * * *